March 21, 1961  W. P. CARPENTER  2,976,481
ADJUSTABLE IMPEDANCE CIRCUIT
Filed April 9, 1956
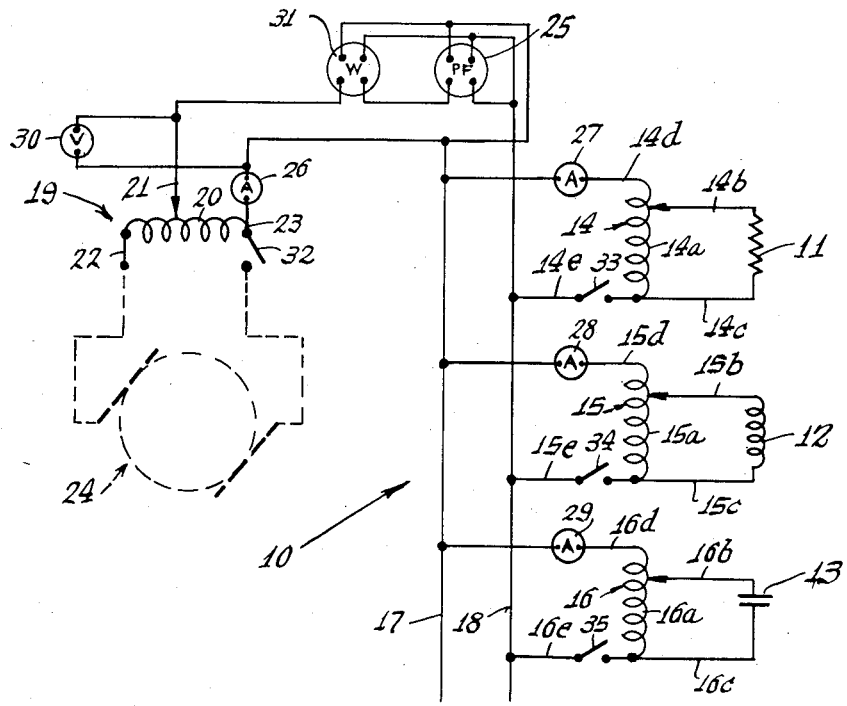
INVENTOR.
William P. Carpenter
BY
Johnson and Kline
ATTORNEYS

United States Patent Office 2,976,481
Patented Mar. 21, 1961

---

2,976,481

ADJUSTABLE IMPEDANCE CIRCUIT

William P. Carpenter, Bristol, Conn., assignor to The Superior Electric Co., Bristol, Conn., a corporation of Connecticut Filed Apr. 9, 1956, Ser. No. 576,992

6 Claims. (Cl. 323—109)

The present invention relates to an impedance circuit and more particularly to an impedance unit for providing a load of adjustable power factor and magnitude utilizable in the testing of alternating current power equipment.

An object of this invention is to provide an impedance or load unit in which both the quality of the load, i.e., the power factor thereof, and the quantity, i.e., the magnitude, may be readily adjusted with ease to precise values within the operating range of the unit and preferably steplessly.

Another object of this invention is to provide an impedance unit in which the power factor thereof can be varied between substantially 90° lag and 90° lead with facility and practically instantaneously.

It is a further object of this invention to provide an impedance unit of the above-mentioned type in which after the power factor of the load has been set at a predetermined value, the magnitude of the load, i.e., between no load and full load, may be varied without disturbing the power factor.

It is another object of this invention to provide an impedance unit of the above-mentioned type which is economical to manufacture, reliable in use, easily adjustable within its range of operation and quickly connected to the device to be tested.

A feature of this invention resides in the provision of having three load elements. One of the load elements being of substantially pure resistive character, another element being of substantially pure inductive reactive character and the third being of substantially pure capacitive reactive character. The value of each of these load elements remains constant, and to provide for adjustment of the amount of each in the load circuit, a portion of the value of each load in the circuit is varied, independently of each other, by the use of adjustable transformers. The input of the transformers are connected in parallel to a pair of leads which in turn are connected to another adjustable transformer. The input of the latter is connected to the source of alternating current, which is generally from the device to be tested. The latter transformer is utilized to control the magnitude of the load after the desired power factor has been established by the first-mentioned three transformers. For providing a true no load condition, a switch is incorporated between the source and the output of the magnitude autotransformer. Thus by mere manipulation of the control knobs, the power factor can be varied independently of the magnitude of the load from substantially 90° lead to 90° lag and also the magnitude of the load can be varied within the operating range of the unit.

Other features and advantages of the invention will be apparent from the specification and claims when considered in connection with the accompanying drawing.

Referring to the drawing, there is shown a schematic diagram of the instant invention, which is generally indicated by the reference numeral 10. The components of the impedance unit 10 may be structurally arranged in any desired manner with regard to compactness, economy of manufacture and ease of accessibility. While the arrangement of the elements has not been shown, it is contemplated to facilitate the manual operation of the unit that the meters and the controls for the various transformers be positioned on a single panel. The three load elements of the unit consist of a resistive load 11, which may be a low temperature strip heater; an inductive load, generally indicated by the reference numeral 12, which may be conventional inductive elements having negligible resistance; and a capacitive load 13 which may consist of one or a plurality of condensers of the type having negligible resistance.

In the testing of alternating current power equipment and in alternating current network analyzers and calculator circuits, the use of resistive, inductive and capacitive loads to examine the reaction of the devices or networks is a common practice. Heretofore, when it was desired to test using such loads, the tester would initially have to determine, either by calculation or approximation, the necessary amounts of each of the load elements. Then it was necessary to piecemeal construct from a plurality of units, having various values, the value of each of the load elements used in the test in order to have the desired power factors and magnitudes of load. With each change of power factor, the tester had to recalculate which values of the load would be necessary and to construct such a load. Additionally, whenever it was desired to test the device for varying magnitudes of load, at the same power factor, it would be necessary to recalculate and reconstruct the load elements in order to provide the requisite amounts of each. It will thus be apparent that in testing any of the above-mentioned devices under conditions of a plurality of power factors and a plurality of magnitudes of load with the same power factor, that needless time and energy were expended to create and construct the necessary load, in order to perform the test operation. Moreover, this manner of testing could not examine the reaction of the unit for substantially continuous changes of both power factor and magnitude of load because of the requirement of reconstructing the load for each variable. Additionally, because of the numerous connections necessary, great skill and training is required on the part of the operator with the increased chance of a misconnection or miscalculation which would harm the equipment and/or the operator and also the need for having in stock a large assortment of various sizes of load elements.

According to the present invention, these detriments in the testing of such devices is overcome by the utilization of adjustable units for inserting the desired portions of each fixed load element into the impedance circuit and obviating the construction of each load. While other types of adjustable devices may be employed, such as tapped transformers, it is presently preferred to use continuously adjustable autotransformers of the type having a movable tap in engagement with a bared commutating surface of the winding for each one of the load elements. The autotransformers 14, 15 and 16 are utilized for the loads 11, 12 and 13 respectively. These autotransformers each have a winding 14a, 15a and 16a and a variable tap 14b, 15b and 16b. The variable taps operate on a bared portion of the convolutions of the windings to provide an adjustable, stepless variation in the amount of load inserted in the circuit. Each load element is positioned between the corresponding tap and a line 14c, 15c and 16c respectively, connected to one end portion of the winding.

The three autotransformers and their respective load elements are connected in parallel and, accordingly, the autotransformer 14 has lines 14d and 14e connecting its winding 14a to a pair of leads 17 and 18. Similarly, the autotransformer 15 has lines 15d and 15e connected to the leads 17 and 18 and the autotransformer 16 has leads 16d and 16e connected to the leads 17 and 18.

Leads 17 and 18 are connected to a magnitude controller by which it is possible to control the magnitude of the load without disturbing the setting of the three autotransformers 14, 15 and 16 which determine the power factor of the load. The magnitude controller 19 is also preferably an adjustable autotransformer and has a winding 20, one end portion of which is connected to the lead 17. The lead 18 is connected to a variable tap 21 of the autotransformer 19 and rides on a commutating surface on the winding 20 for providing adjustable, stepless variations of the load. The winding 20 has leads 22 and 23 which serve as the input to the impedance circuit above described.

Shown in dotted lines and indicated generally by the reference numeral 24 is a generator. When it is desired to test this generator for its load characteristics under various power factors and magnitudes of load, the output of the generator is connected to the leads 22 and 23 as schematically shown in the illustration. While there is shown a generator, the impedance unit of the instant invention is also utilizable in the testing of other alternating current sources such as a transformer, autotransformer and alternators. Additionally, because of the ease of variation in both the power factor and magnitude of load of this device it is decidedly advantageous for use in alternating current network analyzers and calculator circuits.

To obviate the necessity of calibrating the dials of each of the autotransformers 14, 15 and 16 to indicate the power factor and to eliminate any calculations for determining each power factor setting, a power factor meter indicated by the reference numeral 25 is connected in the lead 18 and across the leads 17 and 18. Additionally, to aid in examining the reaction of the devices under test, an ammeter 26 is utilized to measure the current in the load device and ammeters 27, 28 and 29 are employed to measure the current in each of the load elements, independently of the other. Moreover, a voltmeter 30 is connected across the leads 17 and 18 to measure the voltage across the leads and also a wattmeter 31 is in the line 18 and across the lines 17 and 18 to give an indication of the actual power in the impedance devices.

In operation of the impedance unit, the device to be tested whether generator, transformer or network, is connected to leads 22 and 23. The taps 14b, 15b and 16b of the autotransformers 14, 15 and 16 respectively are adjusted to set the impedance unit to the desired power factor as indicated by the power factor meter 25. Mere manipulation of the manual controls of the transformer settings is all that is necessary. After the power factor has been set the tap 21 of the control 19 is varied between its zero and full load position to test the reaction of the devices with varying loads. The meters 26 and 30 serve to indicate the factors necessary to calculate the volt-ampere load while the wattmeter 31 gives a visible indication of the actual load in the impedance unit.

In order to provide for a true no load test a switch 32 is positioned in the line 23 for electrically disconnecting the impedance unit from the device under test without mechanically decoupling the two units. Furthermore, switches 33, 34 and 35 are provided in the lines 14e, 15e and 16e to totally disconnect each of these elements as desired when they are unnecessary in the setting of the power factor.

From the foregoing, there has been disclosed an impedance unit capable of providing an adjustable power factor from substantially 90° lag to substantially 90° lead without the necessity of calculations to determine the size of the various load elements and without requiring mechanical construction of various size load elements to provide the necessary load and in which the value of the load can be accurately set. Additionally, after the power factor has been set the magnitude of the load can be adjusted without altering the power factor or requiring any additional calculations or setups of various size load elements. Moreover, the power factor of the impedance unit can be changed with value of load.

Variations and modifications may be made within the scope of the claims and portions of the improvements may be used without others.

I claim:

1. An adjustable impedance circuit comprising a pair of terminals connectible to a source of alternating current; first means for forming a resistive load of fixed value and including a device for selecting the desired portion of the resistive load to be inserted in the circuit; second means for forming a substantially inductive load of fixed value and including a device for selecting the desired portion of the inductive load to be inserted in the circuit; third means for forming a substantially capacitive load of fixed value and including a device for selecting the desired portion of the capacitive load to be inserted in the circuit; and fourth means electrically connected between the devices in the means and the terminals for varying the magnitude of the sum of the portions of the loads inserted in the circuit.

2. The invention as defined in claim 1 in which each of the devices is an autotransformer having a variable tap and a winding on which the tap rides with the windings connected to the fourth means and in which the load of each device is connected between the variable tap and an end portion of the winding.

3. The invention as defined in claim 1 in which the fourth means includes an adjustable autotransformer having a winding on which a variable tap rides and with the ends of the winding being connected to the terminals.

4. The invention as defined in claim 3 in which the fourth means includes a switch positioned between one of the terminals and the winding of the fourth means for providing a no load condition without mechanically decoupling the circuit from the source.

5. An adjustable impedance circuit comprising a first adjustable autotransformer having a first winding connectible to a source of alternating current and a first variable tap; a pair of leads, one connected to an end portion of the winding and the other connected to the tap; a second adjustable autotransformer having a second winding connected to the pair of leads and a second variable tap; a substantially pure resistive element of fixed value connected between the second tap and an end portion of the second winding whereby the amount of resistive load in the circuit may be varied; a third adjustable autotransformer having a third winding connected to the pair of leads and a third variable tap; a substantially pure inductive load of fixed value connected between the third tap and an end portion of the third winding whereby the amount of inductive load in the circuit may be varied; a fourth adjustable autotransformer having a fourth winding with the end portions of the winding connected to the pair of leads and a fourth variable tap; a substantially pure capacitive load of fixed value connected between the fourth tap and an end portion of the fourth winding; means connected to the second, third and fourth tap for permitting adjustment of each tap independently of the others to vary the power factor of the load between substantially 90° lead and 90° lag; and means connected to the first tap for varying the magnitude of the sum of the portions of the loads to have a power factor as determined by the settings of the second, third and fourth taps in the circuit.

6. The invention as defined in claim 5 in which switch means are provided for disconnecting independently each of the autotransformers from the leads and the whole circuit from the source.

References Cited in the file of this patent
UNITED STATES PATENTS

| | | |
|---|---|---|
| 1,914,395 | Austin | June 20, 1933 |
| 2,036,958 | Reich | Apr. 7, 1936 |
| 2,085,940 | Armstrong | July 6, 1937 |
| 2,310,097 | Langguth et al. | Feb. 2, 1943 |
| 2,325,936 | Blume | Aug. 3, 1943 |
| 2,751,551 | Jansen | June 19, 1956 |